(No Model.)

F. G. KELLOGG.
LUBRICATOR FOR STEAM CYLINDERS.

No. 314,030. Patented Mar. 17, 1885.

WITNESSES:
J. Cook.
C. Sedgwick

INVENTOR:
F. G. Kellogg
BY Munn & Co.
ATTORNEYS.

UNITED STATES PATENT OFFICE.

FORTUNATUS GALBRAITH KELLOGG, OF WINNIPEG, MANITOBA, CANADA.

LUBRICATOR FOR STEAM-CYLINDERS.

SPECIFICATION forming part of Letters Patent No. 314,030, dated March 17, 1885.

Application filed September 6, 1884. (No model.)

*To all whom it may concern:*

Be it known that I, FORTUNATUS GALBRAITH KELLOGG, of Winnipeg, Manitoba, Canada, have invented new and Improved Lubricators for Steam-Cylinders, of which the following is a full, clear, and exact description.

The object of my invention is to effect a regular and uniform supply of lubricant to steam-cylinders; and to that end it consists in the device hereinafter described and claimed.

Reference is to be had to the accompanying drawings, forming a part of this specification, in which similar letters of reference indicate corresponding parts in all the figures.

Figure 1:
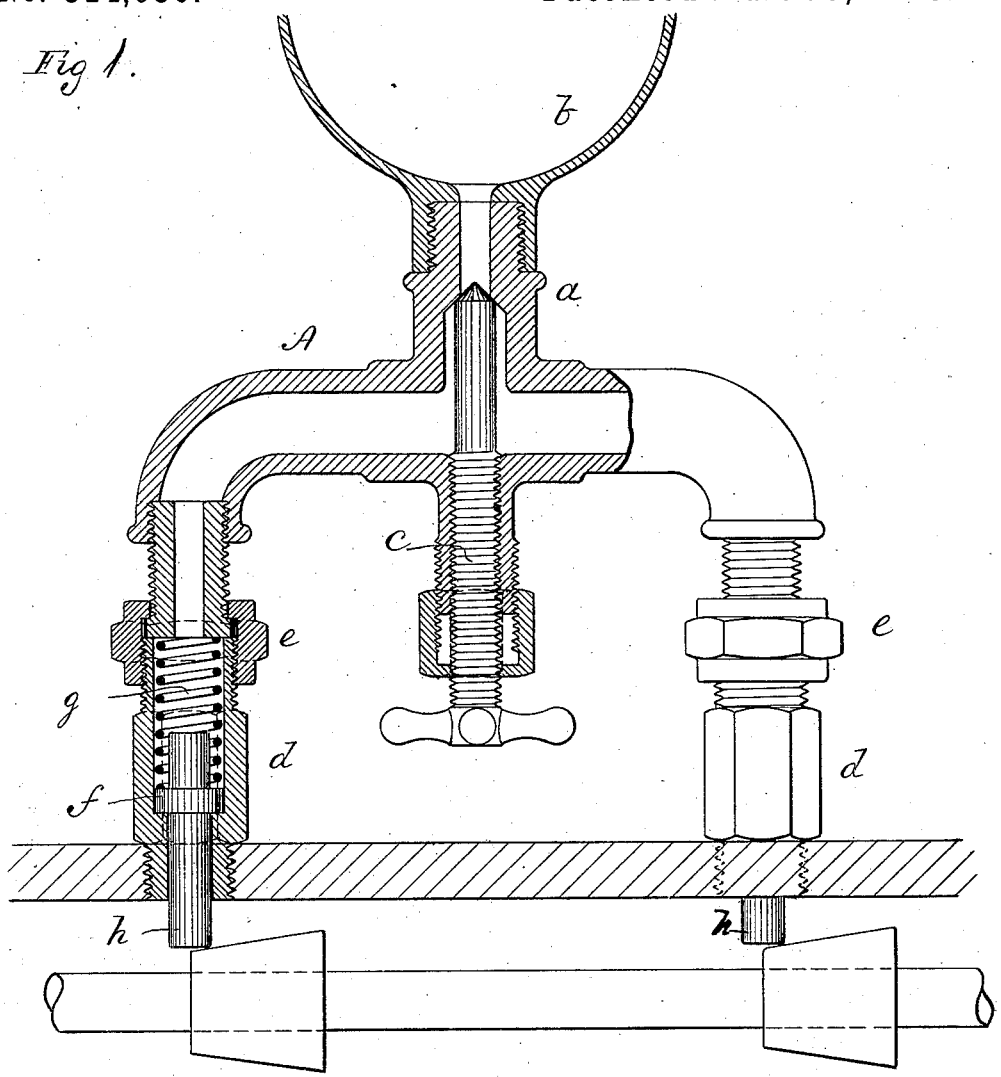
Figure 2:
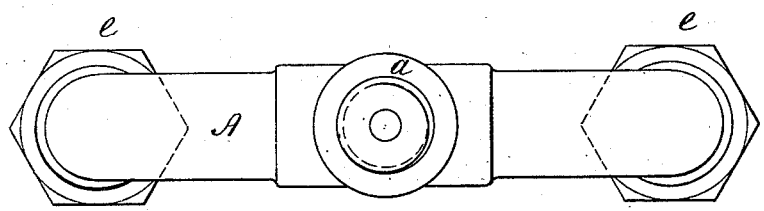

Figure 1 is a sectional elevation of the improved lubricator, and Fig. 2 is a top view of the same.

The body A of the lubricator is a tube with ends bent downward, and made with a boss, $a$, at mid-length, on which the cup $b$ is screwed. Through a neck at the under side passes a screw-stem, $c$, the end of which seats in the opening from the oil-cup, so that the escape of oil can be entirely stopped or regulated at will.

On the ends of tube A are cylinders $d$, connected by couplings $e$, the lower ends of the cylinders being also threaded for screwing into the head or side of the steam cylinder or chest. Cylinders $d$ are counterbored to form seats for disk-valves $f$, whose stems $h$ project outside, and spiral springs $g$ in cylinders $d$ retain the valves $f$ on their seats, and thus prevent escape of oil.

The device being applied to a steam chest or cylinder as illustrated, the valve-stems $h$ project within the cylinder into the path of the valves or projections on the valve-stem, so that at each reciprocation of the main valve-stem the stems $h$ and valves $f$ are lifted, and a regulated amount of oil thus allowed to escape.

In the double form shown the lubricator is specially adapted for use on the steam-cylinders of the air-pumps used with Westinghouse brakes; but the construction may be modified to suit the location.

Having thus described my invention, I claim as new and desire to secure by Letters Patent—

1. The lubricator consisting of tube A, cup $b$, cylinders $d$, attached to the tube ends, valves $f$, projecting stems $h$, and springs $g$, combined for operation, as specified.

2. The combination, in a lubricator, of cup $b$, tube A, cylinder $d$, valve $f$, stem $h$, and spring $g$, substantially as described.

3. In a lubricator, the combination, with the lubricant-feeding valves, with their stems extending into the steam-chamber, of the steam-valves acting upon said stems to open their valves, substantially as and for the purpose set forth.

FORTUNATUS GALBRAITH KELLOGG.

Witnesses:
WILLIAM C. DUTHIE,
JAMES H. ROSS.